(12) United States Patent
Miyazoe (10) Patent No.: US 8,375,986 B2
(45) Date of Patent: Feb. 19, 2013

(54) PNEUMATIC DEVICE CONTROL SYSTEM

(75) Inventor: Shinji Miyazoe, Tsukubamirai (JP)

(73) Assignee: SMC Corporation, Tokyo (JP)

( * ) Notice: Subject to any disclaimer, the term of this patent is extended or adjusted under 35 U.S.C. 154(b) by 1140 days.

(21) Appl. No.: 12/247,442

(22) Filed: Oct. 8, 2008

(65) Prior Publication Data

US 2009/0095930 A1    Apr. 16, 2009

(30) Foreign Application Priority Data

Oct. 10, 2007    (JP) .................................. 2007-264708

(51) Int. Cl.
  *F15B 13/00*    (2006.01)
  *F16K 27/00*    (2006.01)
  *H01R 11/00*    (2006.01)

(52) U.S. Cl. ........................ 137/560; 137/884

(58) Field of Classification Search .................. 137/269, 137/270, 560, 884
  See application file for complete search history.

(56) References Cited

U.S. PATENT DOCUMENTS

| | | | | |
|---|---|---|---|---|
| 5,060,556 A | * | 10/1991 | Weirich et al. ................. | 137/884 |
| 5,493,194 A | * | 2/1996 | Damiano et al. .............. | 318/575 |
| 5,883,785 A | * | 3/1999 | Rohrbeck et al. ............. | 361/731 |
| 6,148,862 A | * | 11/2000 | Doll .............................. | 137/884 |
| 6,164,335 A | * | 12/2000 | Hayashi et al. ............... | 137/884 |
| 6,213,153 B1 | * | 4/2001 | Hayashi et al. ............... | 137/884 |
| 6,216,738 B1 | * | 4/2001 | Ruckwied et al. ............ | 137/884 |
| 6,475,036 B2 | * | 11/2002 | Morikawa ..................... | 439/716 |
| 6,704,815 B1 | * | 3/2004 | Morikawa et al. ............. | 710/71 |
| 7,849,881 B2 | * | 12/2010 | Lee et al. ....................... | 137/884 |
| 7,925,811 B2 | * | 4/2011 | Ottliczky et al. ............. | 137/884 |
| 2001/0003289 A1 | * | 6/2001 | Mead et al. .................... | 137/884 |
| 2009/0307405 A1 | | 12/2009 | Ottliczky | |

FOREIGN PATENT DOCUMENTS

| | | |
|---|---|---|
| JP | 5-1783 | 1/1993 |
| JP | 5-26210 | 2/1993 |
| JP | 5-61580 | 8/1993 |
| JP | 2002-51385 | 2/2002 |
| WO | WO 2007/042090 A1 | 4/2007 |

OTHER PUBLICATIONS

Office Action issued Aug. 24, 2011 in Japan Application No. 2007-264708 (With English Translation).

* cited by examiner

*Primary Examiner* — John Rivell
(74) *Attorney, Agent, or Firm* — Oblon, Spivak, McClelland, Maier & Neustadt, L.L.P.

(57) ABSTRACT

A plurality of valve assemblies having a plurality of manifold valves assembled are electrically coupled in a row via lead wire assemblies to transmit a power signal for driving solenoids of the manifold valves in parallel from the valve assembly at a proximal side of the row to the valve assembly at a leading end side via the manifold valves of the valve assemblies and the lead wire assemblies.

15 Claims, 5 Drawing Sheets

PNEUMATIC DEVICE CONTROL SYSTEM

TECHNICAL FIELD

The present invention relates to a control system for controlling a pneumatic device such as an air cylinder, and more particularly, to a pneumatic device control system which includes a plurality of valve assemblies each having a plurality of sequentially connected manifold valves.

BACKGROUND ART

Generally, a valve assembly formed by sequentially connecting a plurality of manifold valves has been used for controlling the pneumatic device such as an air cylinder. The valve assembly is normally disposed around the pneumatic device such that the respective manifold valves are connected to the pneumatic device via air pipes, and further electrically coupled with a serial unit via a lead wire. The respective manifold valves may be driven by electric signals from the serial unit.

Japanese Unexamined Patent Application Publication No. 2002-51385 discloses a control system using the aforementioned valve assembly, which is structured to control solenoid valves (manifold valves) of the solenoid valve manifold (valve assembly) using serial signals. The control system is formed of the solenoid valve manifold structured by mounting a plurality of solenoid valves on the manifold, and a serial transmission mobile unit (serial unit) for serial transmission to the sequencer. The solenoid valve is driven upon reception of power from the serial transmission mobile unit based on the serial signal from the sequencer.

In the generally employed control system as described above, the solenoid valve manifold and the serial transmission mobile unit correspond one by one. When the serial transmission mobile unit outputs 32 points, 16 solenoid valves each of double solenoid type are assembled. The aforementioned solenoid valves are connected to the corresponding air cylinders via the respective air pipes. However, all the air cylinders are not provided around the solenoid valve manifold. In most of the case, some of the air cylinders are disposed apart from the solenoid valve manifold. In such a case, the long air pipe is required for connecting the air cylinder apart from the solenoid valve manifold, thus causing problems of increase in the air consumption and the response delay.

The solenoid valve manifold may be divided into a plurality of sections so as to be disposed around the air cylinder for solving the aforementioned problem. In this case, the serial transmission mobile unit is also required to be divided into plural sections, or the single serial transmission mobile unit is required to extend different numbers of lead wires with different lengths to the plural sets of the solenoid valve manifolds with the different numbers of the solenoid valves and at the different positions, resulting in complicated system structure.

DISCLOSURE OF INVENTION

It is an object of the present invention to provide a pneumatic device control system which solves the problem of increase in air consumption and the response delay by employing plural valve assemblies, and has a simple and rational structure for connecting the lead wires to the valve assemblies.

The pneumatic device control system according to the present invention is formed of a plurality of valve assemblies including sequentially connected plural manifold valves and electric connectors for connection with lead wires, and lead wire assemblies for electrically coupling the electric connectors of the adjacent valve assemblies, and structured by electrically coupling the plural valve assemblies in a row via the lead wire assemblies.

The manifold valve includes solenoids, plural valve input terminals, and plural valve output terminals. A part of the valve input terminals is connected to the solenoids, and the valve input terminals and the valve output terminals are connected while being shifted by an amount corresponding to the number of terminals connected to the solenoids. The valve output terminals and the valve input terminals of the adjacent manifold valve are connected. The valve input terminal or the valve output terminal of the manifold valve at an end of the row is connected to a connector terminal of the electric connectors.

The lead wire assembly is formed of plural lead wires and electric connection members attached to both ends of the lead wire such that the electric connection members are detachable with respect to the electric connector of the valve assembly. Each number of the valve input terminals and the valve output terminals of the manifold valve, the connector terminals of the electric connectors, the lead wires of the lead wire assembly, and the connection terminals of the electric connection member is set to a value such that the power signal is allowed to be transmitted in parallel to the solenoids of the manifold valve in a whole system. The power signal is transmitted in parallel from the valve assemblies at a proximal side of the row to the manifold valve of the valve assemblies toward a leading end side sequentially via the manifold valves of the valve assemblies and the lead wire assemblies.

In the present invention, the lead wire assembly may have directionality with respect to connection of the adjacent valve assemblies. The directionality is defined by a combination of a protrusion formed on one of the electric connection members and a recess portion formed in one of the electric connectors.

In the preferred embodiment, the control system includes three or more valve assemblies and two or more lead wire assemblies. The electric connectors of all the valve assemblies have same structures with respect to numbers of the connector terminals, and a structure for connecting the lead wire assemblies. All the lead wire assemblies have the same structures with respect to numbers of the lead wires and the connection terminals, and the structure for connecting the electric connectors.

In another preferred embodiment, a serial unit is attached to the first valve assembly at the proximal side of the row. The serial unit is structured to output a power signal from a plurality of power output terminals in parallel based on a serial signal from a sequencer. The power output terminals are connected to the valve input terminal of the manifold valve at the proximal side of the first valve assembly.

In the present invention, each of the electric connection members of the lead wire assemblies may be a female connection member, and each of the electric connectors of the respective valve assemblies may be a male connector.

Preferably, the electric connectors are attached to the valve assemblies having the connector terminals (C) directed toward upper surface thereof. The electric connection members at both ends of the lead wire assemblies are connected to the lead wire having the connection terminal toward a direction at right angle to the lead wire to allow the lead wire assemblies to be detachably attached to the electric connectors from the direction of the upper surface of the valve assemblies.

In the present invention, each of the plural valve assemblies may be disposed around the pneumatic device so as to allow the use of the short air pipe, thus solving such problems as the increase in air consumption and the response delay. The plural valve assemblies are electrically coupled in a row via the lead wire assemblies such that the electric signal is sequentially transmitted to the valve assembly at a leading end side via the valve assembly at a proximal side and the lead wire assemblies. The structure for connecting the respective valve assemblies to the lead wire may be easily and rationally established, resulting in efficient signal transmission.

BEST MODE FOR CARRYING OUT THE INVENTION

Figure 1:
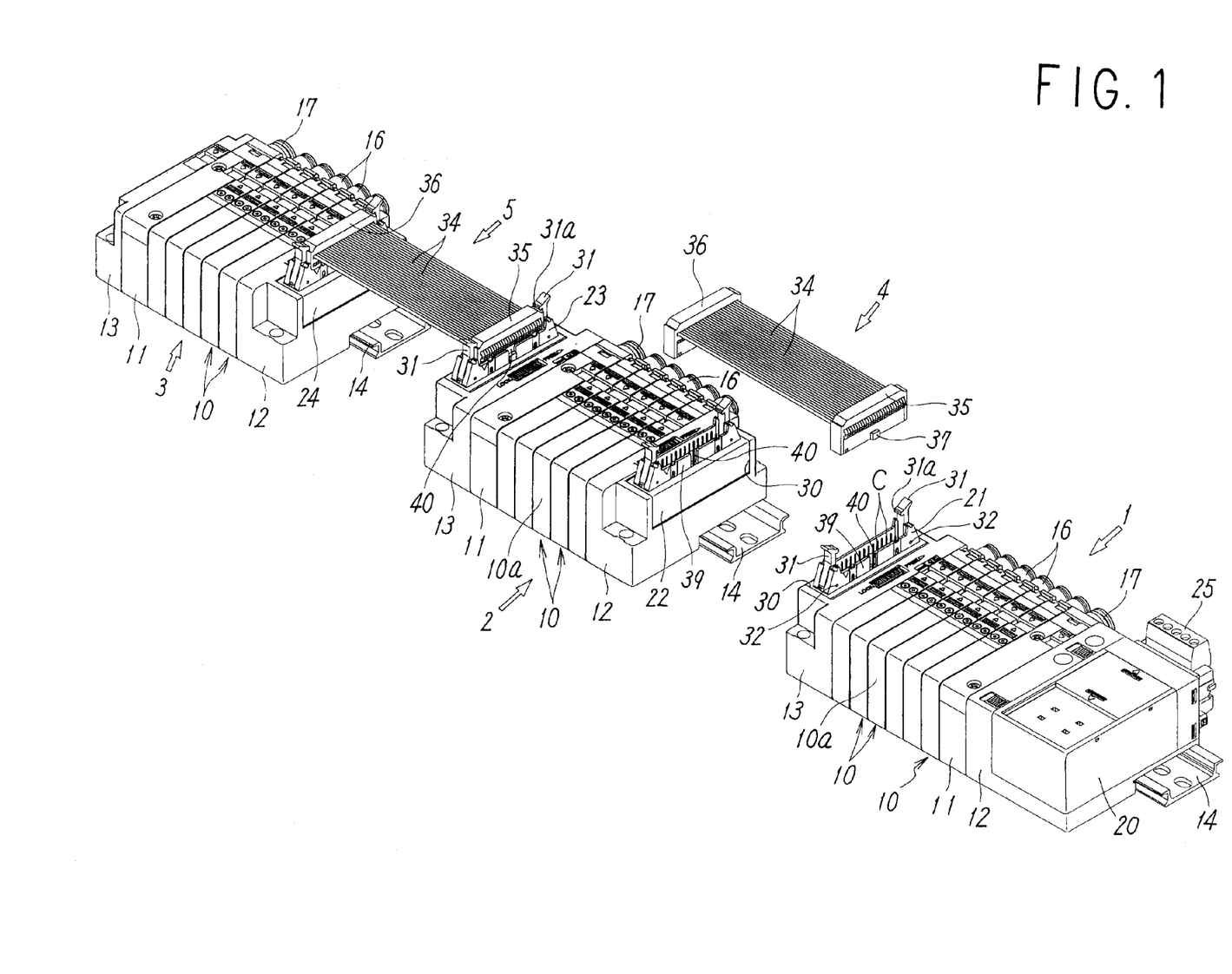
FIG. 1 is a perspective view showing an embodiment of a pneumatic device control system according to the present invention in a state where the lead assembly is partially removed.

FIG. 1 shows a first embodiment of a pneumatic device control system according to the present invention. The control system includes a plurality of valve assemblies 1, 2 and 3, and more than one lead wire assemblies 4 and 5 so as to electrically couple those valve assemblies in a row, respectively. Referring to the drawing, the control system is formed of three valve assemblies of the first to the third valve assemblies 1, 2 and 3, and the two lead wire assemblies, that is, the first and the second assemblies 4 and 5.

Each of the three valve assemblies 1, 2 and 3 includes sequentially connected plural manifold valves 10, a charge/discharge block 11 connected to the manifold valve 10 at a proximal side or a leading end side with respect to the electric signal transmission direction, and a first end block 12 and a second end block 13 connected to the respective sides of the row including the manifold valve 10 and the charge/discharge block 11, respectively. The manifold valves 10, the charge/discharge block 11 and the end blocks 12, 13 are mounted on a rail 14 in predetermined arrangements for the respective valve assemblies 1, 2 and 3.

When the manifold valves 10, the charge/discharge blocks 11, and the first and the second end blocks 12 and 13 assembled with the respective valve assemblies 1, 2 and 3 are differently arranged, each detailed structure of the respective assemblies may differ relative to the other components. Basically, however, they have substantially the same structures and functions. Accordingly, the different structure and function will be described in the following explanation of the embodiment as needed.

Figure 3:
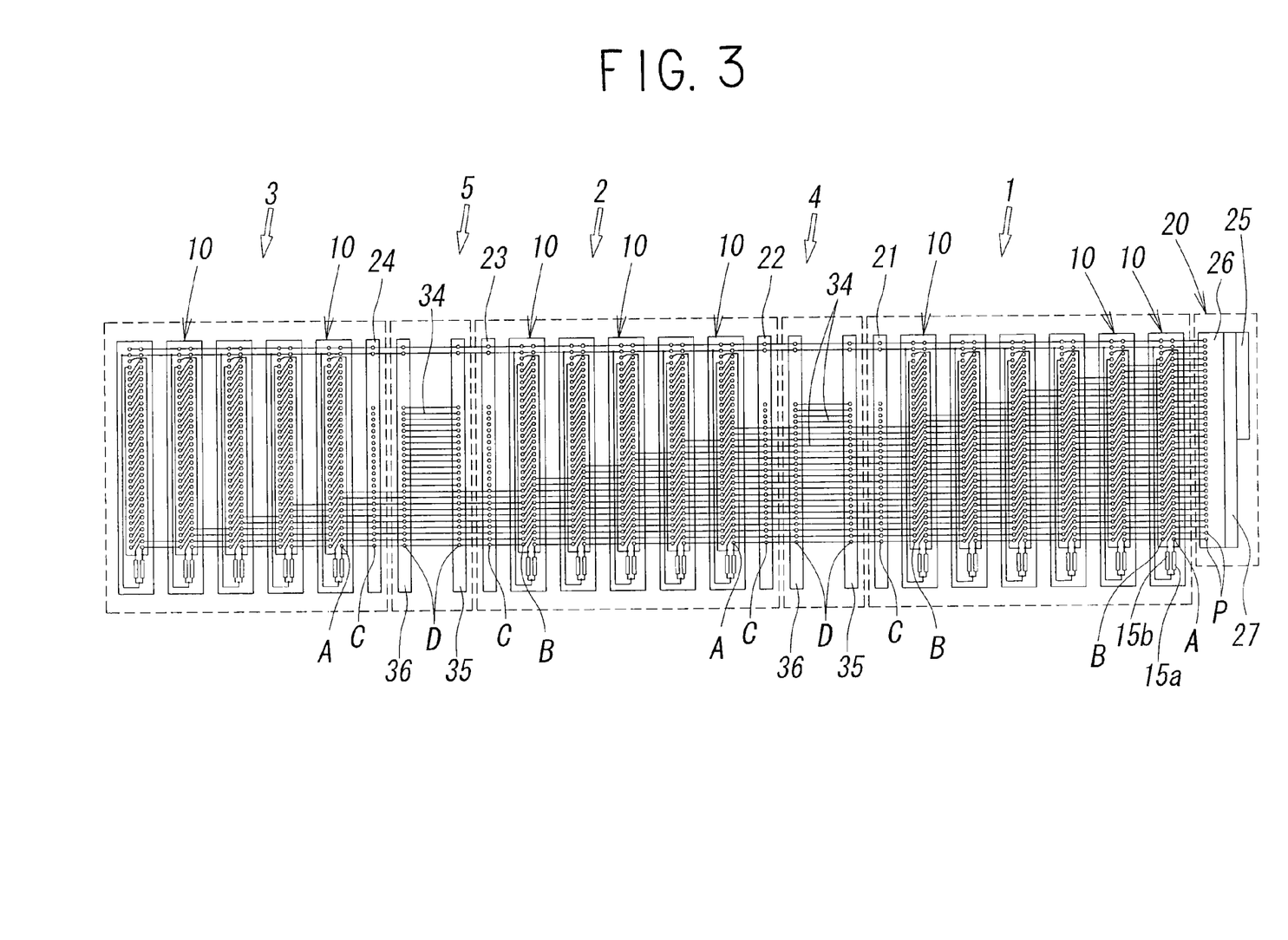
FIG. 3 is an electric circuit diagram of the control system according to the present invention.
Figure 4:
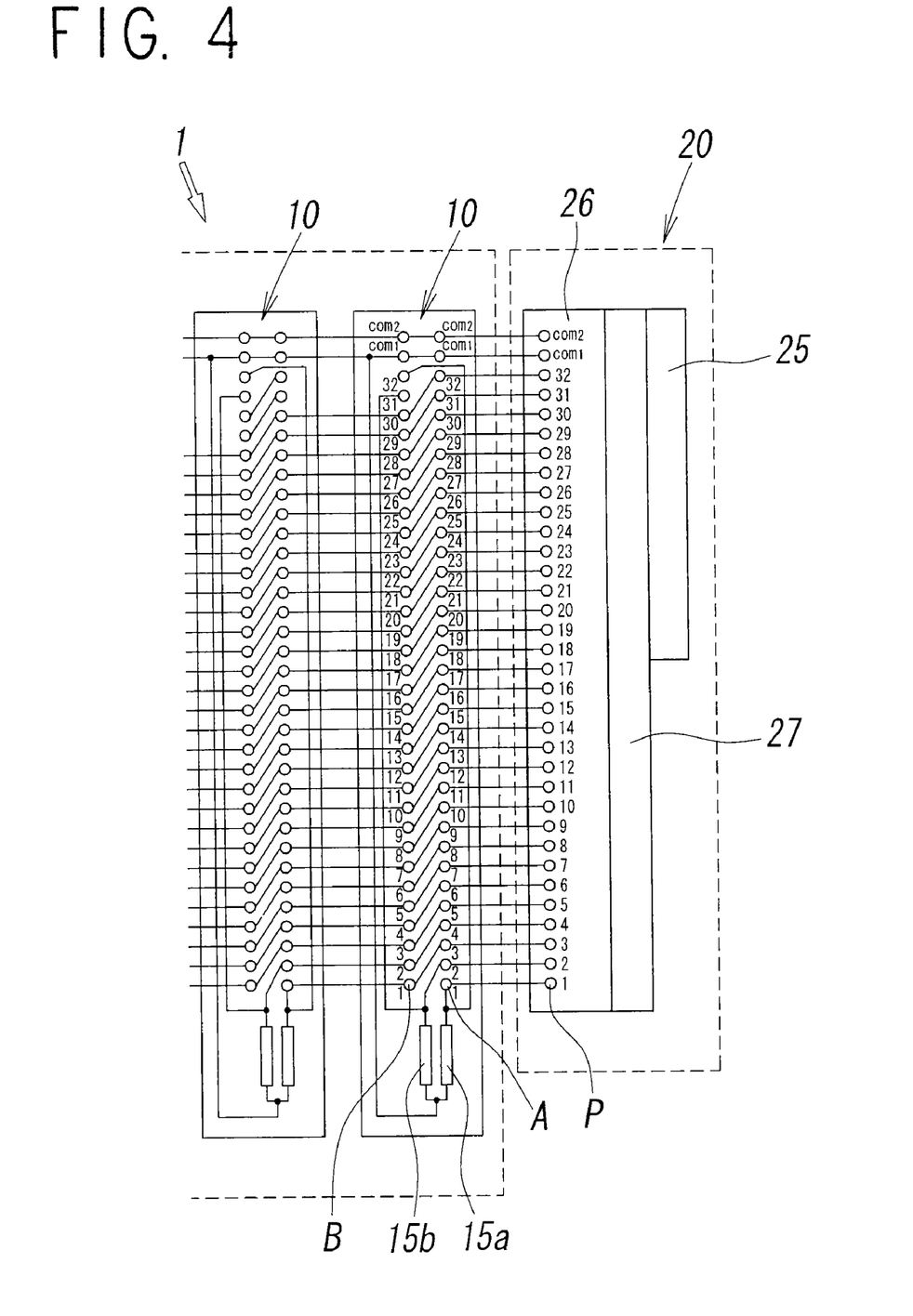
FIG. 4 is an enlarged view showing an essential portion of FIG. 3.
Figure 5:
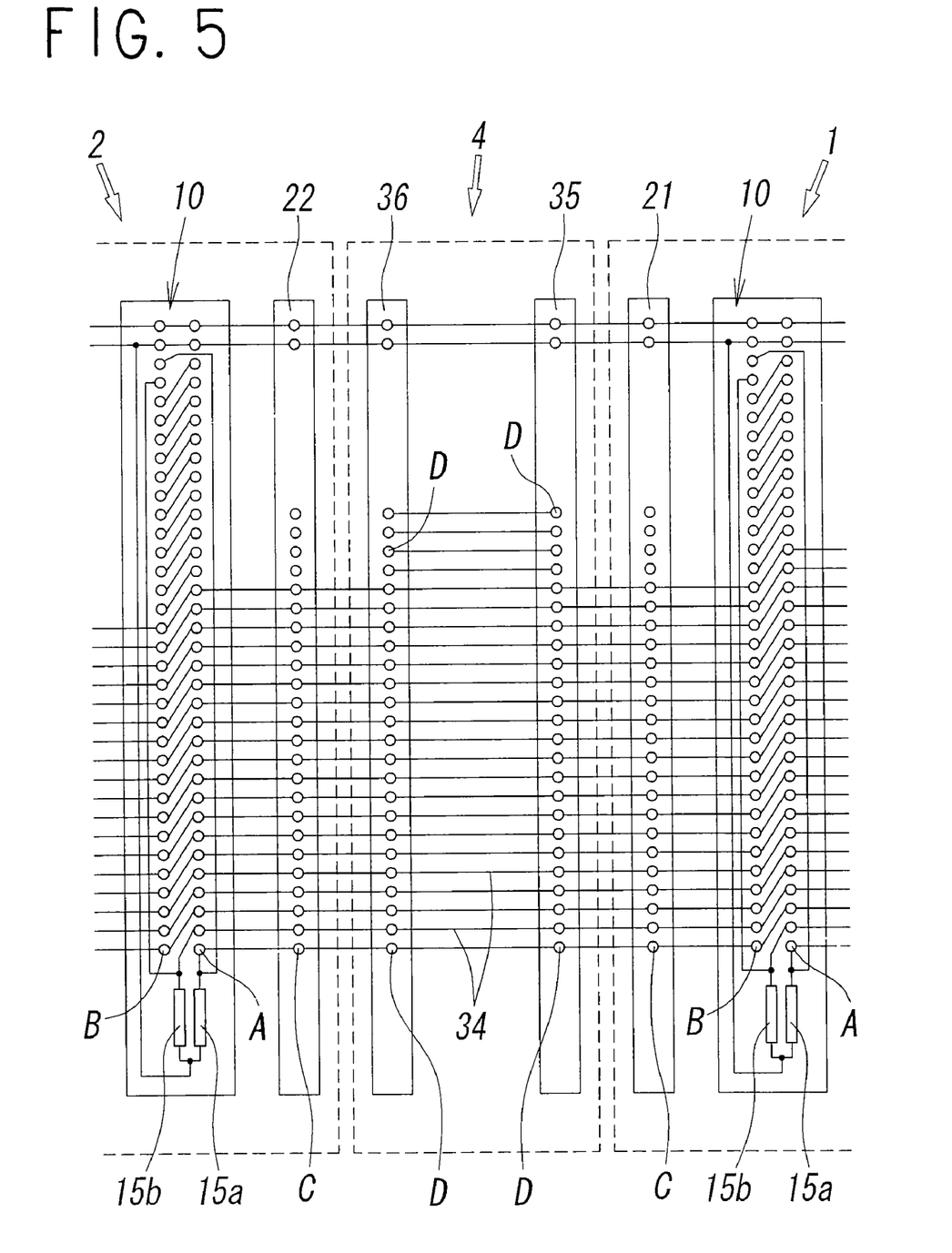
FIG. 5 is an enlarged view showing another essential portion of FIG. 3.

The manifold valve 10 includes a function of the manifold provided with a common supply hole and a common discharge hole, and a function of the solenoid valve which switches the flow path connected to the supply hole and the discharge hole by driving a valve member through excitation of solenoids 15a and 15b (see FIGS. 3 to 5). The supply hole and the discharge hole penetrate the inside of a housing 10a. The respective holes are sequentially communicated when connecting the plural manifold valves 10. Two output ports 16 are formed at upper and lower portions on the front end surface of the respective manifold valves 10. Those output ports 16 are connected to the pneumatic device such as the air cylinder via a not shown air pipe.

In the embodiment, the manifold valves 10 constitute 5-port valve of double solenoid type each having two solenoids 15a and 15b as clearly shown by FIGS. 3 to 5. All the manifold valves 10 or part thereof may constitute a 3-port valve. In case of the 3-port valve, only one output port 16 is provided.

The charge/discharge block 11 includes a supply port 17 and a discharge port (not shown) on the front end surface such that the supply port 17 is communicated with the common supply hole of the manifold valve 10, and the discharge port is communicated with the discharge hole. The charge port 17 is connected to an air feed source (not shown) via the air pipe so as to open the discharge port to the atmosphere.

When the solenoids 15a and 15b of each of the respective manifold valves 10 are energized or de-energized, air is charged to or discharged from the pneumatic device via the output port 16 for controlling the pneumatic device. The solenoids 15a, 15b of the respective manifold valves 10 may be controlled by the electric circuit shown in FIG. 3 via a control unit 20 to be described later.

The first and the second end blocks 12 and 13 include a function for fixing the manifold valves 10 and the charge/discharge block 11 onto the rail 14, and a function for blocking both end portions of the common supply hole and the discharge hole.

Among those three valve assemblies 1, 2 and 3, the first valve assembly 1 at the proximal side of the row has the first end block 12 attached to the control unit 20, and the second end block 13 attached to an electric connector 21. A first electric connection member 35 attached to an end or a signal input side of the first lead wire assembly 4 is electrically coupled with the electric connector 21.

The second valve assembly 2 at an intermediate position of the row has the first end block 12 and the second end block 13 attached to electric connectors 22 and 23, respectively. The electric connector 22 attached to the first end block 12 is connected to a second electric connection member 36 attached to the other end or a signal output side of the first lead wire assembly 4. The electric connector 23 attached to the second end block 13 is connected to the first electric connection member 35 attached to an input side of a second lead wire assembly 5.

The third valve assembly 3 at the leading end side of the row has the first end block 12 attached to an electric connector 24 to which the second electric connection member 36 at the output side of the second lead wire assembly 5 is connected. No electric connector is attached to the second end block 13.

Among three valve assemblies 1, 2 and 3, the first valve assembly 1 at the proximal end side serves as a main valve assembly provided with the control unit 20. The other second and the third valve assemblies serve as sub-assemblies provided with no control unit 20.

The electric connectors 21 and 23 attached to the second end blocks 13 of the first and the second valve assemblies 1 and 2, respectively serve to output electric signals to the valve assemblies 2 and 3 at downstream of the signal transmission direction. The electric connectors 22 and 24 attached to the first end blocks 12 of the second and the third valve assemblies 2 and 3, respectively serve to receive inputs of electric signals.

The aforementioned four electric connectors 21, 22, 23 and 24 have substantially the same structures, and may be attached to the respective end blocks 12 and 13 in substantially the same manner.

The control unit 20 is a serial unit equipped with an input unit 25 and an output unit 26 as shown in FIGS. 1, 3 and 4. The input unit 25 includes a serial reception terminal (not shown) for receiving a serial signal from a sequencer as an external device, and a power receiving terminal (not shown) for receiving driving power from the power supply device. The output unit 26 includes a plurality of power output terminals P for parallel output of the electric signals to the solenoids 15a and 15b of the respective manifold valves 10. In the embodiment shown in the drawings, the serial unit 20 outputs 32 points (limit point), and the power output terminal P has 32 points as well. As two common terminals com are provided, the total number of terminals of the output unit 26 is 34.

The serial unit 20 includes a control section 27 which contains a plurality of switching circuits between the power receiving terminal of the input unit 25 and the respective power output terminals P. Based on the serial signal received by the serial unit 20, the control section 27 activates the switching circuit with the designated address such that the driving power signal is transmitted from the power output terminal P with the designated address to the solenoids 15a and 15b of the manifold valve 10 connected to the power output terminal P.

The total number of the solenoids 15a and 15b which can be controlled by the serial unit 20 for outputting 32 points is 32 at maximum. In the case where the manifold valve 10 has two solenoids 15a and 15b, up to 16 units of the manifold valves 10 may be controlled by the serial unit 20. In the embodiment, among 16 manifold valves 10 of the control system, 6 manifold valves 10 are assembled with the first valve assembly 1, and 5 manifold valves 10 are assembled with the second and the third assemblies 2 and 3, respectively.

Each of the manifold valves 10 includes 32 valve input terminals A and 32 valve output terminals B, respectively which are the same numbers as those of the power output terminals P in the serial unit 20, and two common terminals com. Two valve input terminals A at one end of the terminal row are individually connected to the two solenoids 15a and 15b. The valve input terminals A and the valve output terminals B are connected while being shifted by an amount corresponding to the number of terminals connected to the solenoids 15a and 15b. Specifically, the 1st and the 2nd valve input terminals A1 and A2 from the end of the terminal row are connected to the solenoids 15a and 15b, and further connected to the 32nd and 31st valve output terminals B32 and B31, respectively. The third valve input terminal A3 and subsequent terminals A4 to A32 are connected to the 1st valve output terminal B1 and subsequent terminals B2 to B30, respectively.

The two common terminals com1 and com2 are directly connected correspondingly. The common terminal com1 is connected to the solenoids 15a and 15b.

One of the valve input terminal A and the valve output terminal B (for example, valve input terminal A) is a male terminal, which is disposed at one side surface of the housing 10a. Meanwhile, the other (for example, valve output terminal B) is a female terminal which is disposed at the other side surface of the housing 10a. In the case where the plural manifold valves 10 are connected, the valve output terminal B and the valve input terminal A of the adjacent manifold valves 10, 10 may be electrically coupled through plug-in. The common terminals com may be connected in the same manner as described above.

FIGS. 3 to 5 show the electrically coupled terminal which is relevant only to the transmission of the electric signals to the solenoids 15a and 15b. Actually, all the terminals shown in the drawings are sequentially connected.

In the first valve assembly 1, the power output terminal P of the serial unit 20 is electrically coupled with the valve input terminal A of the manifold valve 10 at the proximal side of the row of six manifold assemblies 10 via the first end block 12 and the charge/discharge block 11. In other words, the power output terminal P and the valve input terminal A are connected with each other via relay terminals (not shown) provided for the first end block 12 and the charge/discharge block 11. The valve output terminal B of the manifold valve 10 at the leading end side of the row of six manifold valves 10 is connected to a connector terminal C of the electric connector 21 for output via a relay terminal (not shown) provided for the second end block 13.

The electric connector 21 is a male connector having the pin-like connector terminal C, and detachably installed in a recess portion 30 formed in an upper surface of the second end block 13 having the connector terminal C directed upward. The direction of the electric connector 21 may be changed such that the connector terminal C is laterally positioned.

The number of the connector terminals C may be the same as that of the power output terminals P, that is, 32. However, power supply to the solenoids 15a and 15b of six manifold valves 10 assembled with the first valve assembly 1 with the electric connector 21 therethrough is not required. Power supply to the solenoids 15a and 15b of ten manifold valves 10 in the second and the third valve assemblies 2 and 3 is only required. Accordingly, the number of the connector terminals C may be smaller than 32 so long as it is set to at least 20. In the embodiment, the number of the connector terminals C is set to 24, which is larger than 20. The total number of terminals of the electric connector 21 including the two common terminals com is 26.

Fixing arms 31, 31 are attached to both longitudinal ends of the electric connector 21 so as to be tilted inward and outward around a support shaft 32. The fixing arms 31, 31 are tilted outward when connecting the electric connection member 35 at the end of the lead wire assembly 4 to the electric connector 21. After connection of the electric connection member 35, the fixing arms 31, 31 are raised such that hooks 31a inside the upper ends of the fixing arms 31, 31 are fixed to the electric connection member 35 so as not to fall out.

In the second valve assembly 2, the connector terminal C of the electric connector 22 for inputting attached to the first end block 12 is electrically coupled with the valve input terminal A of the manifold valve 10 at the proximal side of the row of five manifold valves 10 via the relay terminal (not shown) in the first end block 12. The connector terminal C of the electric connector 23 for outputting attached to the second end block 13 is electrically coupled with the valve output terminal B of the manifold valve 10 at a leading end side of the row via the relay terminal (not shown) provided in the charge/discharge block 11.

In the third valve assembly 3, the connector terminal C of the electric connector 24 for inputting attached to the first end block 12 is electrically coupled with the valve input terminal A of the manifold valve 10 at the proximal side of the row of five manifold valves 10.

Figure 2:
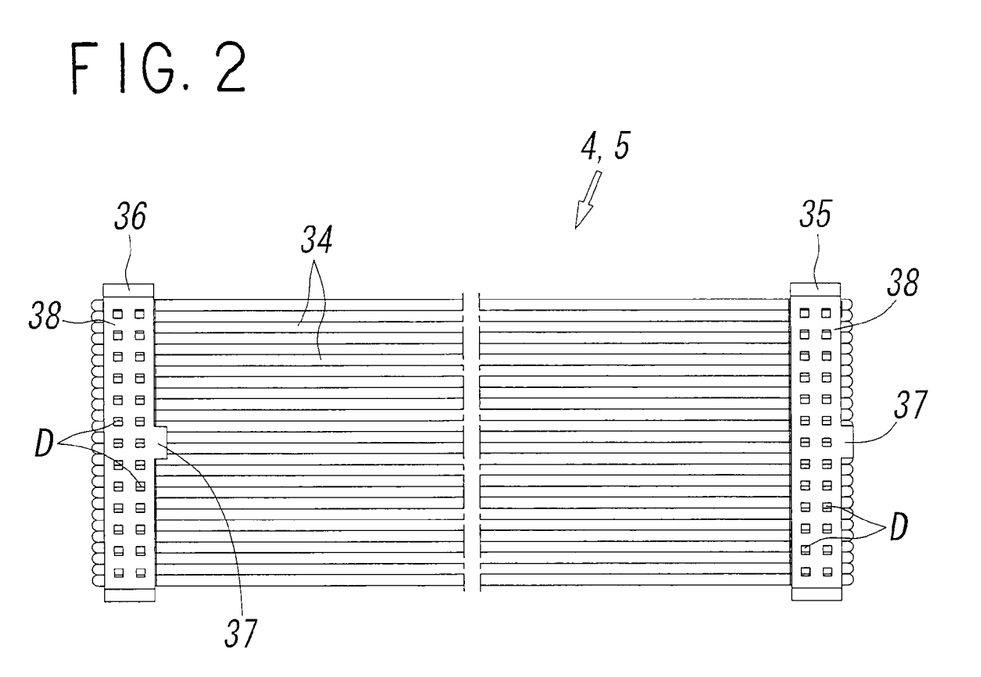
FIG. 2 is a view showing a lower surface of the lead wire assembly.

As shown in FIG. 2, each of the lead wire assemblies 4 and 5 is formed of a plurality of lead wires 34 which are bound in parallel into a flat-cable-like configuration, and two first and second electric connection members 35 and 36 attached to the respective ends of the lead wires 34. The electric connection members 35 and 36 are detachably connected to the electric connectors 21 to 24 of the valve assemblies 1, 2 and 3. The first electric connection member 35 is connected to the electric connectors 21 and 23 for outputting in the valve assembly upstream of the first electric connection member 35. The second electric connection member 36 is connected to the electric connectors 22 and 24 for inputting in the valve assembly downstream of the second electric connection member 36.

The plural lead wires 34 do not have to be formed into the flat-cable-like configuration but may be formed separately.

Each of the first and the second electric connection members 35 and 36 is formed by providing a plurality of female connection terminals D into which the connector terminals C of the electric connectors 21 to 24 are inserted in a thin rectangular housing 38. Those connection terminals D are arranged to be positioned in the direction at right angle to the lead wires 34. The electric connection members 35 and 36 are structured to be detachable with respect to the electric connectors 21 to 24 of the respective valve assemblies from above.

The number of the connection terminals D is the same as that of the connector terminals C of the electric connectors 21 to 24. In the example shown in the drawing, the number of the connection terminals D including two common terminals is 26. Accordingly, the number of the lead wires 34 including two common wires is 26.

Each of the first and the second electric connection members 35 and 36 has a protrusion 37 for preventing improper connection. The protrusion 37 of the first electric connection member 35 is formed in the center of the outer side surface of the housing 38 in the longitudinal direction. The protrusion 37 of the second electric connection member 36 is formed in the center of the inner side surface of the housing 38 in the longitudinal direction.

Each of the electric connectors 21 and 23 for outputting in the valve assemblies 1 and 2 has a recess portion 40 at the portion of a rectangular housing 39 corresponding to the protrusion 37 of the first electric connection member 35, that is, the center of the side wall directed inward of the valve assembly. Each of the electric connectors 22 and 24 for inputting has the recess portion 40 in the sidewall of the rectangular housing 39 corresponding to the protrusion 37 of the second electric connection member 36 on the side wall of the rectangular housing 39, that is, the center of the side wall directed outward of the valve assembly.

In the aforementioned structure, the first electric connection member 35 is connectable only to the electric connectors 21 and 23 for outputting of the valve assembly upstream of the first electric connection member 35. The second electric connection member 36 is connectable only to the electric connectors 22 and 24 for inputting of the valve assembly downstream of the second electric connection member 36. This may prevent the lead wire assemblies 4 and 5 from being connected having lateral position (proximal and leading end sides) inverted. In other words, each of the lead wire assemblies 4 and 5 has the directionality with respect to connection among those valve assemblies 1, 2 and 3.

The positional relationships between the protrusions 37 of the electric connection members 35 and 36 may be inverted to the one shown in the drawing. In this case, the relationship with respect to front and rear positions of the recess portions 40 in the respective electric connectors 21 to 24 may be inverted to the one shown in the drawing. The electric connection members 35 and 36 may have the recess portions 40, and the protrusions 37 may be formed on the electric connectors 21 to 24.

The electric connectors 21 to 24 have the same structures. The recess portions 40 are formed in the second end blocks 13 of the first and the second valve assemblies 1 and 2 while being directed to the proximal side of the valve assembly row such that the electric connectors 21 and 23 are used for outputting. The recess portions 40 are formed in the first end blocks 12 of the second and the third valve assemblies 2 and 3 in the same position such that the electric connectors 22 and 24 are used for inputting.

The two lead wire assemblies 4 and 5 have basically the same structures with respect to the number and arrangement of the lead wires 34 and the connection terminals D, and structures for connecting the electric connectors 21 to 24. Accordingly, the lead wire assemblies 4 and 5 may be exchangeable to be used at the inverted positions.

Each length of the lead wires 34 of the two lead wire assemblies 4 and 5 does not have to be the same. When the distance between the first and the second valve assemblies 1 and 2, and the distance between the second and the third valve assemblies 2 and 3 are different, each length of the lead wires 34 of the two lead wire assemblies 4 and 5 may be different.

In the thus structured pneumatic device control system, the aforementioned three valve assemblies 1, 2 and 3 are disposed around the pneumatic device such as the air cylinder. Those valve assemblies are electrically coupled in a row using the two lead wire assemblies 4 and 5.

When the serial unit 20 assembled with the first valve assembly 1 receives the serial signal from the sequencer, the switching circuit of the control section 27 of the serial unit 20 is activated such that the driving power signal is output to the solenoids 15a, 15b to which the power signal for outputting from the power output terminal P with the designated address is connected. Then the corresponding manifold valve 10 is driven.

When the manifold valve 10 to be driven is assembled with the first valve assembly 1, the power signal is transmitted from the power output terminal P of the serial unit 20 to the manifold valve 10 directly or via the adjacent manifold valve 10. When the manifold valve 10 to be driven is assembled with the second valve assembly 2, the power signal is transmitted from the first valve assembly 1 to the manifold valve 10 via the first lead wire assembly 4. When the manifold valve 10 to be driven is assembled with the third valve assembly 3, the power signal is transmitted from the first valve assembly 1 to the manifold valve 10 sequentially via the first lead wire assembly 4, the second valve assembly 2, and the second lead wire assembly 5.

In the aforementioned control system, the valve assemblies 1, 2 and 3 may be disposed around the pneumatic device so as to solve the problem of the increase in the air consumption by the use of the short air pipe.

The plural valve assemblies are electrically coupled in a row by the lead wire assemblies to transmit the power signal sequentially from the valve assembly at the proximal side of the row sequentially to the valve assembly at the leading end side in parallel via the manifold valves of the valve assemblies and the lead wire assemblies. The resultant structure for connecting the lead wires to the respective valve assemblies becomes simple and rational so as to perform rational signal transmission.

The control system according to the embodiment includes three valve assemblies, and two lead wire assemblies. The respective numbers of the valve assemblies and the lead wire assemblies are not limited to those described above. For example, the control system may be formed of four valve assemblies each having four manifold valves, and three lead wire assemblies for electrically coupling those valve assemblies. Arbitrary combination of the valve assemblies and the lead wire assemblies may be employed.

If the output point of the serial unit is set to the number other than 32, the number of the manifold valves in the system becomes different. If the output point of the serial unit is 16, the maximum number of the manifold valves of the system is 8. The aforementioned numbers of the manifold valves are divided into the plural valve assemblies so as to be assembled.

In the embodiment, the electric connection members 35 and 36 at respective ends of the lead wire assemblies 4 and 5 are structured to be detachable with respect to the electric connectors 21 to 24 of the valve assemblies from above. The electric connectors 21 to 24 may be attached to the end blocks 12 and 13 sideways, and the electric connection members 35 and 36 may also be attached to the lead wire assemblies 4 and 5 laterally such that the electric connection members 35 and 36 are detachable with respect to the electric connectors 21 to 24 sideways. Alternatively, one of the electric connection members 35 and 36 may be structured to be detachable with respect to the corresponding electric connectors 21, 23 or 22, 24 sideways, and the other electric connection member may be structured to be detachable with respect to the corresponding electric connectors 22, 24 or 21, 23 from above.

The connection terminals D of at least one of the electric connection members 35 and 36, and preferably, the electric connection terminal 35 at the input side may be formed as male terminals without forming the connection terminals D of the electric connection members 35 and 36 at the respective ends of the lead wire assemblies 4 and 5 into the female terminals. If the connection terminal D of the electric connection member 35 is formed into the male terminal, the connector terminal C of the corresponding electric connector is formed as the female terminal accordingly.

In the embodiment, all the manifold valves are of double solenoid type with two solenoids. However, a portion of or all the manifold valves may be of the single solenoid type using the single solenoid.

The input unit with the terminals by the same number as the total number of the power output terminals and the common terminals is provided instead of providing the serial unit in the first valve assembly. The input unit and the serial unit or the other control unit as external devices are connected in parallel via the plural lead wires or connectors such that the power signal is received in parallel and then transmitted to the respective valve assemblies.

The invention claimed is:

1. A pneumatic device control system comprising:
a plurality of valve assemblies, each valve assembly including a plurality of sequentially connected manifold valves and at least one electric connector for connection with lead wires, and
lead wire assemblies that electrically couple the respective electric connectors of adjacent valve assemblies, such that the plurality of valve assemblies are electrically coupled in a row via the lead wire assemblies,
wherein each manifold valve includes one or two solenoids,
a plurality of valve input terminals, and
a plurality of valve output terminals,
wherein each solenoid is connected to a valve input terminal, and the valve input terminals are connected to valve output terminals, connections between the valve input terminals and the valve output terminals being shifted by an amount corresponding to the number of valve input terminals connected to the solenoids in each manifold valve,
wherein at least one of the plurality of the valve output terminals in each manifold valve, except for a last manifold valve in a leading end side of the row, are connected to adjacent valve input terminals of respective adjacent manifold valves in the row,
wherein the valve input terminal or the valve output terminal of a manifold valve disposed adjacent to an electric connector is connected to a connector terminal of the adjacent electric connector,
wherein each lead wire assembly is includes a plurality of lead wires, and
an electric connection member attached to each end, respectively, of the lead wires, the electric connection members being detachable with respect to the respective electric connectors of the respective valve assemblies, and
wherein each number of the valve input terminals and the valve output terminals of each manifold valve, the connector terminals of the electric connectors, the lead wires of each lead wire assembly, and the connection terminals of each electric connection member are set to a value such that a parallel power signal is allowed to be transmitted in parallel to the respective solenoids of the manifold valves in a whole system, and the power signal is transmitted in parallel from the valve assemblies at a proximal side of the row to the respective manifold valves of the valve assemblies toward a leading end side sequentially via the respective manifold valves of the valve assemblies and the lead wire assemblies.

2. The control system according to claim 1, wherein each lead wire assembly has directionality with respect to connection of adjacent valve assemblies.

3. The control system according to claim 2, wherein the directionality is defined by a combination of a protrusion or a recess portion formed on one of the electric connection members and a recess portion or a protrusion formed in a corresponding electric connector.

4. The control system according to claim 1, wherein the plurality of valve assemblies includes three or more valve assemblies and the plurality of lead wire assemblies includes two or more lead wire assemblies,
wherein the electric connectors of all the valve assemblies are structurally identical with respect to numbers of the connector terminals and with respect to a structure for connecting the lead wire assemblies, and
wherein all the lead wire assemblies are structurally identical with respect to numbers of the lead wires and the connection terminals and with respect to a structure for connecting the electric connectors.

5. The control system according to claim 2, wherein the plurality of valve assemblies includes three or more valve assemblies and the plurality of lead wire assemblies includes two or more lead wire assemblies,
wherein the electric connectors of all the valve assemblies are structurally identical with respect to numbers of the connector terminals and with respect to a structure for connecting the lead wire assemblies, and
wherein all the lead wire assemblies are structurally identical with respect to numbers of the lead wires and the connection terminals and with respect to a structure for connecting the electric connectors.

6. The control system according to claim 1, wherein a serial unit is attached to a first valve assembly at the proximal side of the row,
wherein the serial unit is structured to output a power signal from a plurality of power output terminals in parallel based on a serial signal from a sequencer, and
wherein the power output terminals are connected to corresponding valve input terminals of a first manifold valve at a proximal side of the first valve assembly.

7. The control system according to claim 2, wherein a serial unit is attached to a first valve assembly at the proximal side of the row,
   wherein the serial unit is structured to output a power signal from a plurality of power output terminals in parallel based on a serial signal from a sequencer, and
   wherein the power output terminals are connected to corresponding valve input terminals of a first manifold valve at a proximal side of the first valve assembly.

8. The control system according to claim 1, wherein each of the electric connection members of the lead wire assemblies is a female connection member, and
   wherein each of the electric connectors of the respective valve assemblies is a male connector.

9. The control system according to claim 2, wherein each of the electric connection members of the lead wire assemblies is a female connection member, and
   wherein each of the electric connectors of the respective valve assemblies is a male connector.

10. The control system according to claim 1, wherein the electric connectors are attached, respectively, to the valve assemblies such that the respective connector terminals are directed toward an upper surface of the valve assemblies; and
    wherein the electric connection members at both ends of the respective lead wire assemblies are connected to the lead wires such that the connection terminals are toward a direction at a right angle to the lead wires to allow the lead wire assemblies to be detachably attached to the electric connectors from the direction of the upper surface of the valve assemblies.

11. The control system according to claim 2, wherein the electric connectors are attached, respectively, to the valve assemblies such that the respective connector terminals are directed toward an upper surface of the valve assemblies; and
    wherein the electric connection members at both ends of the respective lead wire assemblies are connected to the lead wires such that the connection terminals are toward a direction at a right angle to the lead wires to allow the lead wire assemblies to be detachably attached to the electric connectors from the direction of the upper surface of the valve assemblies.

12. The control system according to claim 1, wherein each of the electric connectors includes a first and second fixing arm disposed respectively on opposing longitudinal ends of the electric connectors, each of the first and second fixing arms including a hook that engages with a recessed portion on a corresponding electric connection member to prevent the electric connection members from inadvertently detaching from the electric connectors.

13. The control system according to claim 1, wherein the electric connection members include first and second electric connection members each including a housing having a protrusion that extends from a face thereof, and
    wherein the first and second electric connection members are arranged with respect to the lead wires such that the protrusion on the housing of the second electric connection member extends beneath the lead wires toward the first electric connection member, and the protrusion on the housing of the first electric connection member extends away from the lead wires and the second electric connection member.

14. A pneumatic device control system comprising:
   a plurality of valve assemblies, each valve assembly including a plurality of sequentially connected manifold valves and at least one electric connector for connection with lead wires, and
   lead wire assemblies that electrically couple the respective electric connectors of adjacent valve assemblies, such that the plurality of valve assemblies are electrically coupled in a row via the lead wire assemblies,
   wherein each manifold valve includes
   one or two solenoids totaling an integer X,
   a plurality of valve input terminals being numbered from 1 to an integer Y, and a plurality of valve output terminals being correspondingly numbered from 1 to an integer Y,
   wherein each solenoid is connected to a valve input terminal and a valve output terminal, and remaining valve input terminals, which are not connected to a solenoid, are connected to remaining valve output terminals, which are not connected to a solenoid, connections between the remaining valve input terminals and the remaining valve output terminals being shifted by a number corresponding to the integer X, such that a remaining valve input terminal that is numbered Z, where Z is an integer between X and Y+I, is connected to the remaining output terminal that is numbered Z-X,
   wherein at least one of the plurality of the valve output terminals in each manifold valve, except for a last manifold valve in a leading end side of the row, are connected to correspondingly numbered adjacent valve input terminals of respective adjacent manifold valves in the row,
   wherein the valve input terminal or the valve output terminal of a manifold valve disposed adjacent to an electric connector is connected to a connector terminal of the adjacent electric connector,
   wherein each lead wire assembly includes
   a plurality of the lead wires, and
   an electric connection member attached to each end, respectively, of the lead wires, the electric connection members being detachable with respect to the respective electric connectors of the respective valve assemblies, and
   wherein each number of the valve input terminals and the valve output terminals of each manifold valve, the connector terminals of the electric connectors, the lead wires of each lead wire assembly, and the connection terminals of each electric connection member are set to a value such that a parallel power signal is allowed to be transmitted in parallel to the respective solenoids of the manifold valves in a whole system, and the power signal is transmitted in parallel from the valve assemblies at a proximal side of the row to the respective manifold valves of the valve assemblies toward a leading end side sequentially via the respective manifold valves of the valve assemblies and the lead wire assemblies.

15. The control system according to claim 14, wherein the electric connection members include first and second electric connection members each including a housing having a protrusion that extends from a face thereof, and
    wherein the first and second electric connection members are arranged with respect to the lead wires such that the protrusion on the housing of the second electric connection member extends beneath the lead wires toward the first electric connection member, and the protrusion on the housing of the first electric connection member extends away from the lead wires and the second electric connection member.

* * * * *